United States Patent
Defrance et al.

(10) Patent No.: US 7,903,694 B2
(45) Date of Patent: Mar. 8, 2011

(54) GENERATION AND OPERATION OF A DOUBLE TIMESTAMP FOR TRANSMITTING A SYNCHRONIZING SIGNAL IN A PACKET SWITCHING NETWORK

(75) Inventors: Serge Defrance, Rennes (FR); Thierry Tapie, Rennes (FR); Gael Mace, Langan (FR)

(73) Assignee: Thomson Licensing, Boulogne-Billancourt (FR)

( * ) Notice: Subject to any disclaimer, the term of this patent is extended or adjusted under 35 U.S.C. 154(b) by 54 days.

(21) Appl. No.: 12/225,019

(22) PCT Filed: Mar. 12, 2007

(86) PCT No.: PCT/FR2007/050914
§ 371 (c)(1),
(2), (4) Date: Sep. 11, 2008

(87) PCT Pub. No.: WO2007/104888
PCT Pub. Date: Sep. 20, 2007

(65) Prior Publication Data
US 2009/0034560 A1    Feb. 5, 2009

(30) Foreign Application Priority Data
Mar. 13, 2006 (FR) .................................. 06 50836

(51) Int. Cl.
*H04J 3/06* (2006.01)
(52) U.S. Cl. ..................... 370/503; 370/507; 370/516

(58) Field of Classification Search ............... 370/503, 370/507, 516, 518
See application file for complete search history.

(56) References Cited

U.S. PATENT DOCUMENTS

| | | | |
|---|---|---|---|
| 5,487,067 A * | 1/1996 | Matsushige | 370/460 |
| 5,805,602 A | 9/1998 | Clouter et al. | |
| 6,675,326 B1 * | 1/2004 | Yoshizaki | 714/48 |
| 7,548,600 B2 * | 6/2009 | Laine et al. | 375/355 |
| 7,711,328 B1 * | 5/2010 | Samad | 455/76 |
| 2002/0061012 A1 * | 5/2002 | Thi et al. | 370/352 |
| 2002/0174105 A1 * | 11/2002 | De La Huerga | 707/1 |
| 2005/0008040 A1 * | 1/2005 | Becker et al. | 370/503 |
| 2006/0013262 A1 * | 1/2006 | Downey et al. | 370/503 |
| 2007/0286245 A1 * | 12/2007 | Yamada | 370/503 |

OTHER PUBLICATIONS

Search Report Dated Sep. 18, 2007.

* cited by examiner

*Primary Examiner* — Chi H Pham
*Assistant Examiner* — Farah Faroul
(74) *Attorney, Agent, or Firm* — Robert D. Shedd; Jeffrey M. Navon

(57) ABSTRACT

A device is disclosed for transmitting packets in a packet communication network comprising at least two stations, including in particular means for generating a first timestamp from a sampled value of a master counter, means for generating a second timestamp from a sampled value of a second counter synchronized on the at least two stations and means for transmitting jointly the two timestamps in the packet communication network. A device is further disclosed for receiving packets in a packet communication network, which uses the double timestamp generated by the transmitter device.

17 Claims, 2 Drawing Sheets

GENERATION AND OPERATION OF A DOUBLE TIMESTAMP FOR TRANSMITTING A SYNCHRONIZING SIGNAL IN A PACKET SWITCHING NETWORK

This application claims the benefit, under 35 U.S.C. §365 of International Application PCT/FR2007/050914, filed Mar. 12, 2007, which was published in accordance with PCT Article 21(2) on Sep. 20, 2007 in French and which claims the benefit of French patent application No. 0650836, filed Mar. 13, 2006.

SCOPE OF THE INVENTION

The present invention relates to the domain of communication networks.

The present invention relates more particularly to a device able to transmit packets and to a device able to receive packets in a packet communication network comprising at least two stations. A double timestamp is generated at transmission and used at reception for the transmission of a synchronisation signal, preferably of Genlock type (synchronisation locking) in a packet switching network that is preferably of the IP (Internet Protocol) type.

PRIOR ART

The development of IP networks and their ability to transport all types of signal (data or video) means that it is being envisaged to use these networks as the "backbone" architecture for video studios. Of capital importance to this evolution is having a single infrastructure for the transport of data. Whereas in the past, several media were necessary to transport different signal types, only one cable is now required due to the multiplexing possibilities offered by the IP layer.

Among the various signals that must be transported on the IP network, there is the Genlock signal. This signal is specific to the video studio environment. It is used to synchronize various video devices, such as cameras. A Genlock signal comprises two synchronisation signals, one is repeated every 40 ms and indicates the start of the video frame, the other is repeated every 64 μs (for a standard format and less for a HD format) and indicates the start of lines in the video frame.

FIG. 1 shows the transmission of a Genlock signal via an IP network in a video studio environment. In this figure, the cameras are connected to analogue/digital converters that are connected to network adaptors, themselves linked by Ethernet to an IP network. A studio console, as well as possibly other studio elements, is connected to the IP network by means of network adaptors. The question that is presented by such a system is the following: How to transmit the Genlock signal between the cameras and the studio console and/or other studio elements so that the Genlock signal at reception is rigorously in frequency and in phase with the Genlock signal at transmission?

The 61588 IEC standard was designed to supply a synchronized clock in a multi-vendor distributed computing system. Such a clock is useful for coordinating activities, such as for example, an industrial process, or for correlating data measurements in a packet communications network. A typical application is the synchronisation of a Genlock video signal on different cameras connected to the network.

The prior art discloses, through the American patent U.S. Pat. No. 5,805,602 (Bell Atlantic Network Services), a network surveillance system for variation in cell delay. This American patent describes an arrangement (device and method) to monitor the jitter caused during the transport of digitally coded information in a packet switching network, and to manage the functioning of the network according to the jitter detected. The jitter detected is used to determine if a corrective action is necessary, such as a re-routing of network traffic or the implementation of network maintenance operations. The arrangement described detects the PCR (Program Clock Reference) values of an MPEG encoded transport stream. Each pair of PCR values represents an expected arrival instant of a segment of the corresponding stream. A real arrival time for the corresponding stream segment is determined in response to the detection of corresponding PCR values and an independent clock signal. The expected arrival time of a stream segment and the real arrival time are correlated with an accumulation of expected and real arrival times of stream segments of data packets received previously in order to determine the jitter in the digital data stream. The jitter is corrected by a combination of buffering and recalibration of the PCR value with the corrected values coincidental with the real arrival time of the stream segments.

The method and the device described in this American patent suggests comparing the expected time of reception of a packet, reflected by the PCR value, with the observed time of packet arrival, calculated using a time base independent of the transmission time base local to the reception device. The comparison was based on an independent local counter. The PCR received in the local time base is converted (the two conversion parameters were previously calculated over a dozen samples) and compared with the value of the local counter at the moment of reception. The difference provides the evaluated jitter.

The invention of this American patent only enables frequency synchronisation, and does not enable phase synchronisation of two remote items of equipment. The invention of this American patent is limited to localized jitter correction (column 19, line 21) which implies that phase synchronisation is not possible. However the phase synchronisation of two time bases is necessary for certain applications, for example the synchronisation of items of video equipment in the direction of the Genlock. In addition, the invention of this American patent relies on a time base independent of the time base to be transmitted of the reception equipment and bases its calculations on the instants of packet reception containing PCR type samples, which involves specific equipment for the detection of the arrival of these packets.

SUMMARY OF THE INVENTION

The precision of the synchronisation of the IEC 61588 clock cannot satisfy the requirements of the video signal. This is the reason for which it may be necessary to transmit a video clock. With this objective, a double layer system is proposed here: a standard PCR ("Program Clock Reference") system to transmit the video clock, and an IEC 61588 layer or its equivalent, to render the transmission of a "PCR-like" packet jitter free.

The technical problem that this invention proposes to resolve consists in frequency and phase synchronizing two items of equipment connected to each other by a packet communication network, while avoiding having to use specific equipment for the detection of the arrival of some packets.

For this purpose, the present invention concerns, in the most generally accepted sense, a device able to transmit packets in a packet communication network comprising at least two stations, including:

means for receiving a signal, means for deriving a frequency and a phase from said received signal, means for initialising a counter, referred to as the master counter, by means of the derived frequency and phase, characterized in that it comprises:

means for sampling the master counter value at regular intervals, means for generating a first temporal timestamp from a sampled value of the master counter, means for sampling a second counter synchronised with all the stations of the network at the same instant as the sampling of the master counter, means for generating a second temporal timestamp from a sample value of the of the second counter, means for transmitting together the two temporal timestamps in the network.

Preferably, said received signal is of the Genlock type.

Advantageously, the packet communication network is an IP (Internet Protocol) type network.

According to a preferred variant, said device capable of transmitting packets in a packet communication network is an item of video equipment.

Preferably, the second counter synchronised on all the network stations is synchronised by means of the IEC 61588 standard.

The present invention also relates to a device able to receive packets in a packet communication network comprising at least two stations, characterised in that it comprises:

means for sampling the value of a first counter referred to as the slave counter, at regular intervals.

means for generating a first temporal timestamp "Timestamp 1_RX" from a sampled value of the slave counter, means for sampling a second counter synchronised with all the stations of the network at the same instant as the sampling of the slave counter, means for generating a second temporal timestamp "Timestamp_2_RX" from the sampled value of the second counter, means for, on reception of a packet comprising two timestamps "Timestamp 1 TX" and "Timestamp 2_TX" and network, correcting the difference between "Timestamp 1 TX" and "Timestamp 2_RX" by difference between "Timestamp_2_TX" and "Timestamp_2_RX" and means for controlling the slave counter according to said corrected difference.

Preferably, said device able to receive packets in a packet communication network comprises the means for storing together the two timestamps "Timestamp_1_RX" and "Timestamp_2_RX".

Advantageously, the packet communication network is an IP (Internet Protocol) type network.

According to a preferred embodiment, said device able to receive packets is a video equipment.

Preferably, the second counter synchronised on all the network stations is synchronised by means of the IEC 61588 standard.

According to an embodiment, said device able to receive packets comprises a filter that receives the corrected difference and controls the slave counter.

Advantageously, the filter characteristics determine the characteristics of a regenerated signal.

According to a particular implementation, the regenerated signal is of the Genlock type.

BRIEF DESCRIPTION OF THE DRAWINGS

The invention will be better understood from the following description of an embodiment of the invention provided as an example by referring to the annexed figures, wherein.

DETAILED DESCRIPTION OF THE EMBODIMENTS OF THE INVENTION

The main difficulty for transmission of a clock in an IP network is due to the fact that the transmission time of a packet in the network is not constant. Consequently, there is always a time difference between the instant when the packet is received and the instant when it was meant to be received. The difference corresponds to the transmission "jitter". Its average is null but, for each packet, the value is not null. The problem is that, very often, the time information contained in the packet is calculated according to its forecast arrival time. The actual arrival time is different from the forecast arrival time, and the difference is the jitter value for that packet. Consequently, the time information contained in the packet is tainted with an error whose value is the jitter value.

The difficulty no longer exists if it is possible to calculate the transmission delay for each packet. This is possible if another timestamp from a network clock that is assumed to be already synchronised by other means, such as the IEC 61588 standard for example, is added to each video clock timestamp. The second timestamp evaluates the transmission time of the packet transporting the first timestamp and enables a correction as if the packet had been transmitted without jitter.

It is proposed to associate with each timestamp of a counter to be transmitted in the packet communication network (as in a PCR-like method), a timestamp of another counter referred to as the network counter, that is already synchronized in the packet communication network by other means, such as that described in the IEC 61588 standard for example. The two timestamps form a single and coherent information field, the second timestamp value (of the network counter).

Figure 1:
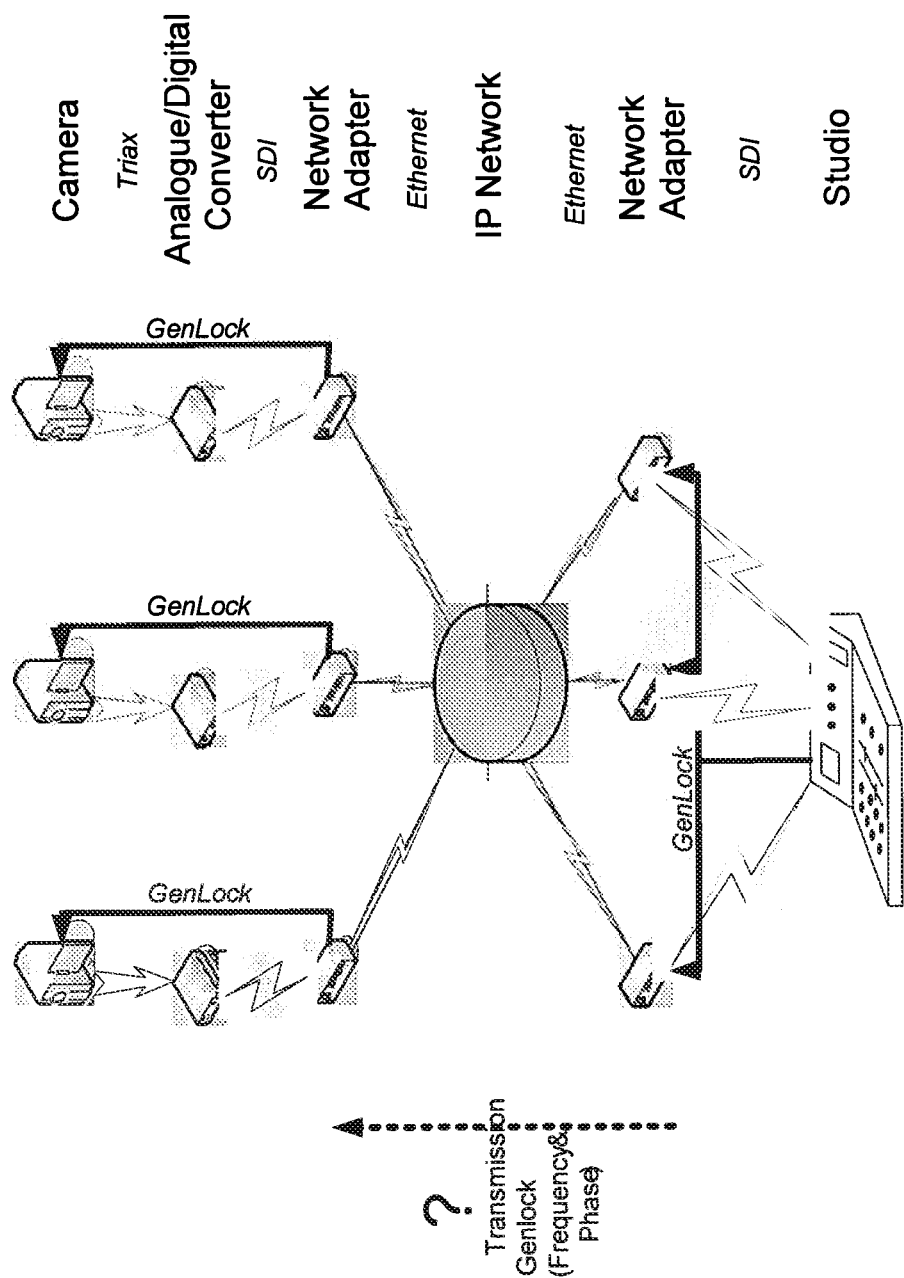
FIG. 1 shows the transmission of a Genlock signal via an IP network in a video studio environment.
Figure 2:
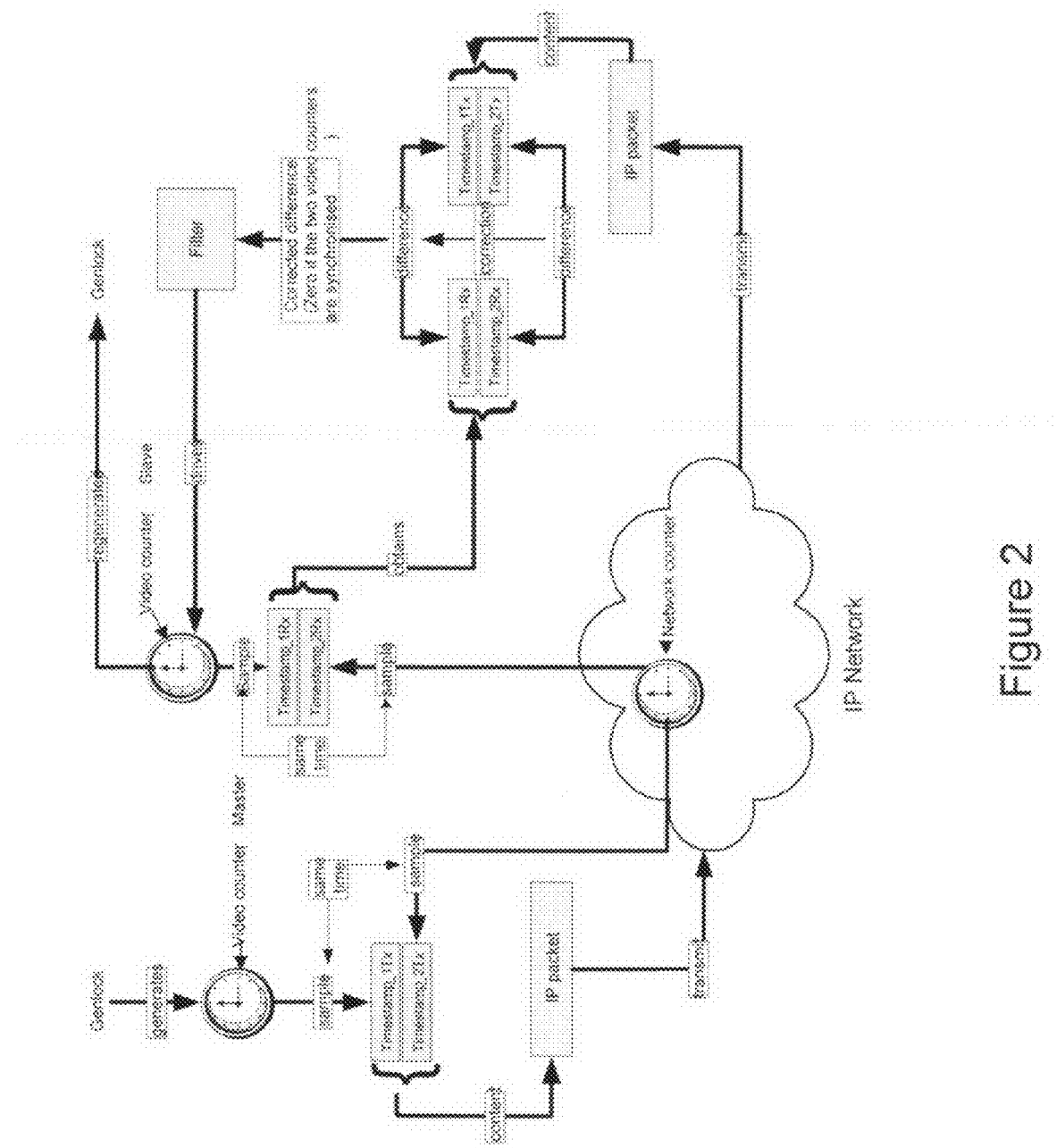
FIG. 2 shows an implementation of the method for generating a double timestamp according to the present invention.

FIG. 2 shows how the principle of a double timestamp is used for the synchronization of video counters.

On the transmission side, from a Genlock video signal are first derived a frequency and phase that drive and reinitialise the video counter. This video counter is called the master video counter. At regular intervals, the value of the video counter is sampled to generate a "Timestamp $1_{tx}$" ("Timestamp_1 Tx" on FIG. 2) At exactly the same moment, the network counter is also sampled to generate a "Timestamp_$2_{tx}$" ("Timestamp_2Tx" on FIG. 2). "Timestamp_$1_{tx}$" and "Timestamp_$2_{tx}$" are transmitted together in the network to the reception side.

On the reception side, there is also a video counter that is referred to as the slave video counter. The objective is to synchronize the slave video counter on the master video counter. The Genlock signal that is regenerated from the slave video counter will then be synchronised on the Genlock signal driving the master video counter.

As for the emission side, the video counter and the network counter are regularly sampled, generating a "Timestamp_$1_{rx}$" ("Timestamp_1Rx" in FIG. 2) and a "Timestamp_$2_{rx}$" ("Timestamp_2Rx" in FIG. 2) that are stored together. The instant of the generation of the timestamps cannot be synchronized between the emission side and reception side. When a packet is received on the reception side, the difference between the "Timestamp_$2_{tx}$" and "Timestamp_$2_{rx}$" is used to correct (subtract from) the difference between the "Timestamp_$1_{tx}$" and the "Timestamp_$1_{rx}$". If the slave video counter is perfectly synchronised on the master video counter, the corrected difference is equal to zero. If the corrected difference is not equal to zero, the frequency at which the slave counter counts must be modified. A filter receives the corrected differences and is responsible for controlling the frequency of the slave video counter. The filter characteristics determine the characteristics of the regenerated Genlock signal.

The invention is described in the preceding text as an example. It is understood that those skilled in the art are capable of producing variants of the invention without leaving the scope of the patent.

The invention claimed is:

1. Apparatus for transmitting packets in a packet communication network comprising at least two stations, including:
   means for receiving a signal,
   means for deriving a frequency and a phase from said received signal,
   means for initializing a counter, referred to as the master counter, by means of the derived frequency and phase, wherein said apparatus comprises:
   means for sampling the master counter value at regular intervals,
   means for generating a first timestamp from a sampled value of the master counter,
   means for sampling a second counter synchronized with the at least two stations of the packet communication network at the same instant as the sampling of the master counter,
   means for generating a second timestamp from a sample value of the second counter,
   means for transmitting together said first and second timestamp in the packet communication network.

2. The apparatus according to claim 1, wherein the packet communication network is an IP (Internet Protocol) type network.

3. The apparatus according to claim 1, wherein the second counter synchronized on the at least two stations is synchronized by means of the IEC 61588 standard.

4. The apparatus according to claim 1, wherein said received signal is of Genlock type.

5. Apparatus for receiving packets in a packet communication network comprising at least two stations, wherein said apparatus comprises:
   means for sampling the value of a first counter referred to as the slave counter, at regular intervals.
   means for generating a first timestamp from a sampled value of the slave counter,
   means for sampling a second counter synchronized with the at least two stations of the packet communication network at the same instant as the sampling of the slave counter,
   means for generating a second timestamp from the sampled value of the second counter,
   means for, on reception of a packet comprising a third timestamps and a fourth timestamp from the packet communication network,
   correcting the difference between the first timestamp and the third timestamp by means of the difference between the second timestamp and the fourth timestamp, and
   means for controlling the slave counter according to said corrected difference.

6. The apparatus according to claim 5, wherein it comprises the means to store the first timestamp and the second timestamp.

7. The apparatus according to claim 6, wherein said apparatus comprises a filter that receives the corrected difference and controls the slave counter.

8. The apparatus according to claims 6, wherein the second counter synchronized on the at least two stations is synchronized by means of the IEC 61588 standard.

9. The apparatus according to claim 8, wherein said apparatus comprises a filter that receives the corrected difference and controls the slave counter.

10. The apparatus according to 5, wherein the packet communication network is an IP (Internet Protocol) type network.

11. The apparatus according to claim 10, wherein the second counter synchronized on the at least two stations is synchronized by means of the IEC 61588 standard.

12. The apparatus according to claim 11, wherein the filter characteristics determine the characteristics of a regenerated signal.

13. The apparatus according to claim 12, wherein the regenerated signal is of the Genlock type.

14. The apparatus according to claim 10, wherein said apparatus comprises a filter that receives the corrected difference and controls the slave counter.

15. The apparatus according to claim 5, wherein the second counter synchronized on the at least two stations is synchronized by means of the IEC 61588 standard.

16. The apparatus according to claim 15, wherein said apparatus comprises a filter that receives the corrected difference and controls the slave counter.

17. The apparatus according to claim 5, wherein said apparatus comprises a filter that receives the corrected difference and controls the slave counter.

* * * * *